US012742534B2

(12) United States Patent
Zhou et al.

(10) Patent No.: US 12,742,534 B2
(45) Date of Patent: Sep. 22, 2026

(54) OPTICAL COMPONENT, LIGHTING DEVICE, AND MOTOR VEHICLE

(71) Applicant: VALEO VISION, Bobigny (FR)

(72) Inventors: Haiqing Zhou, Hubei (CN); Christophe Dubosc, Bobigny (FR); Xian Zhang, Hubei (CN); Dan Fang, Hubei (CN); Guoliang Xie, Hubei (CN)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 19/105,575

(22) PCT Filed: Aug. 4, 2023

(86) PCT No.: PCT/EP2023/071709

§ 371 (c)(1),
(2) Date: Feb. 21, 2025

(87) PCT Pub. No.: WO2024/041871

PCT Pub. Date: Feb. 29, 2024

(65) Prior Publication Data

US 2026/0055869 A1 Feb. 26, 2026

(30) Foreign Application Priority Data

Aug. 24, 2022 (CN) ......................... 202222255359.6

(51) Int. Cl.
*F21S 43/235* (2018.01)
*F21S 41/20* (2018.01)
(Continued)

(52) U.S. Cl.
CPC ........... *F21S 43/253* (2024.05); *F21S 41/285* (2018.01); *F21S 41/335* (2018.01); *F21S 43/239* (2018.01);
(Continued)

(58) Field of Classification Search
CPC ........ F21S 43/253; F21S 43/50; F21S 41/335; F21S 43/239; F21S 43/245; F21S 43/31;
(Continued)

(56) References Cited

U.S. PATENT DOCUMENTS 8,807,775 B2 8/2014 Sekiguchi et al.
9,822,953 B2 11/2017 Park
(Continued)

FOREIGN PATENT DOCUMENTS

WO 2021227177 A1 11/2021

OTHER PUBLICATIONS

European Patent Office, International Search Report and Written Opinion of corresponding PCT Application No. PCT/EP2023/071709, dated Nov. 17, 2023.

*Primary Examiner* — Bao Q Truong
(74) *Attorney, Agent, or Firm* — Valeo Vision

(57) ABSTRACT

The present invention relates to an optical component including a light source configured to emit light, a light guide unit configured to receive and guide light emitted by the light source and output the light from the light output surface of the light guide unit, and a backplate configured to provide support for the light guide unit. The light guide unit includes at least a first portion and a second portion, the at least first portion and second portion being arranged at a certain angle to each other. The present invention further provides a lighting device and a motor vehicle.

12 Claims, 2 Drawing Sheets

(51) Int. Cl.

| | |
|---|---|
| ***F21S 41/33*** | (2018.01) |
| ***F21S 43/20*** | (2018.01) |
| ***F21S 43/239*** | (2018.01) |
| ***F21S 43/245*** | (2018.01) |
| ***F21S 43/31*** | (2018.01) |
| ***F21S 43/50*** | (2018.01) |
| *F21Y 115/10* | (2016.01) |

(52) U.S. Cl.
CPC ....... *F21S 43/245* (2018.01); *F21S 43/26241* (2024.05); *F21S 43/265* (2024.05); *F21S 43/31* (2018.01); *F21S 43/50* (2018.01); *F21Y 2115/10* (2016.08)

(58) Field of Classification Search
CPC .. F21S 41/285; F21S 43/265; F21S 43/26241; F21Y 2115/10; G02B 6/0001; G02B 6/0075; G02B 6/0078; G02B 6/0076
See application file for complete search history.

(56) References Cited

U.S. PATENT DOCUMENTS

| | | | | |
|---|---|---|---|---|
| 2016/0116666 | A1* | 4/2016 | Sato | F21S 43/26261<br>362/509 |
| 2018/0038569 | A1* | 2/2018 | Hanulak | F21S 43/245 |
| 2020/0158309 | A1* | 5/2020 | Noh | F21S 43/50 |
| 2020/0391657 | A1* | 12/2020 | Kindl | F21S 43/241 |

* cited by examiner

OPTICAL COMPONENT, LIGHTING DEVICE, AND MOTOR VEHICLE

TECHNICAL FIELD

The present invention relates to the field of vehicle lighting technology, in particular to an optical component, a lighting device, and a motor vehicle.

BACKGROUND OF THE INVENTION

Lighting devices are used to provide light for lighting and/or optical indication functions, widely applicable in various fields, such as lighting devices like headlamps used in motor vehicles to ensure safe driving. In motor vehicles, various types of vehicle lamps are often required to implement different functions, including headlamps, fog lights, tail lights, turn signal lights, brake lights, side marker lights, parking lights, etc.

Simple flat or static lighting has failed to meet customer requirements.

SUMMARY OF THE INVENTION

Therefore, an objective of the present invention is to propose an optical component, a lighting device, and a motor vehicle that can at least partially solve the above-mentioned problem.

The present invention discloses an optical component, comprising a light source configured to emit light; a light guide unit configured to receive and guide light emitted by the light source and output the light from the light output surface of the light guide unit; and a backplate configured to provide support for the light guide unit, wherein the light guide unit comprises at least a first portion and a second portion, the at least first portion and second portion being arranged at a certain angle to each other.

In some embodiments, the light source is configured at one end of the light guide unit.

In some embodiments, the light guide unit extends substantially perpendicular to the main emitting direction.

In some embodiments, an angle between adjacent parts of the light guide unit is obtuse.

In some embodiments, the at least first and second portions are integrally formed.

In some embodiments, the at least first and second portions of the light guide unit are arranged on the same plane.

In some embodiments, a rib is provided between the at least first and second portions to separate the at least first and second portions.

In some embodiments, the rib is integrally formed with the backplate.

In some embodiments, the rib extends along the entire longitudinal direction of the light guide unit.

In some embodiments, the length of the rib exceeds the input end of the light guide unit 102.

In some embodiments, the optical component further comprises a transparent front plate, which is arranged on the light output side of the light guide unit and configured to transmit light from the light output surface.

In some embodiments, the light output surface of the transparent front plate is provided with a pattern.

In some embodiments, the optical component further comprises a scattering layer arranged between the light guide unit and the transparent front plate.

According to another aspect of the present invention, a lighting device is further provided, comprising any one of the optical components described above.

According to another aspect of the present invention, a motor vehicle is further provided, comprising the lighting device described above.

In the optical component of the present invention, different parts of the light guide unit are arranged at an angle, such that surface illumination is achievable while a three-dimensional luminescent effect is obtained. In addition, since different parts of the light guide unit are separated by ribs, the different parts are separately controllable and light leakage between adjacent parts is avoided, which allows the production of satisfactory dynamic luminescent effects.

BRIEF DESCRIPTION OF THE DRAWINGS

The above-described characteristics, technical features and advantages of the present invention and modes of implementation thereof will be further explained below in a clear and easy-to-understand manner through a description of preferred embodiments by referring to the drawings. In the drawings.

DETAILED DESCRIPTION OF THE INVENTION

Figure 1:
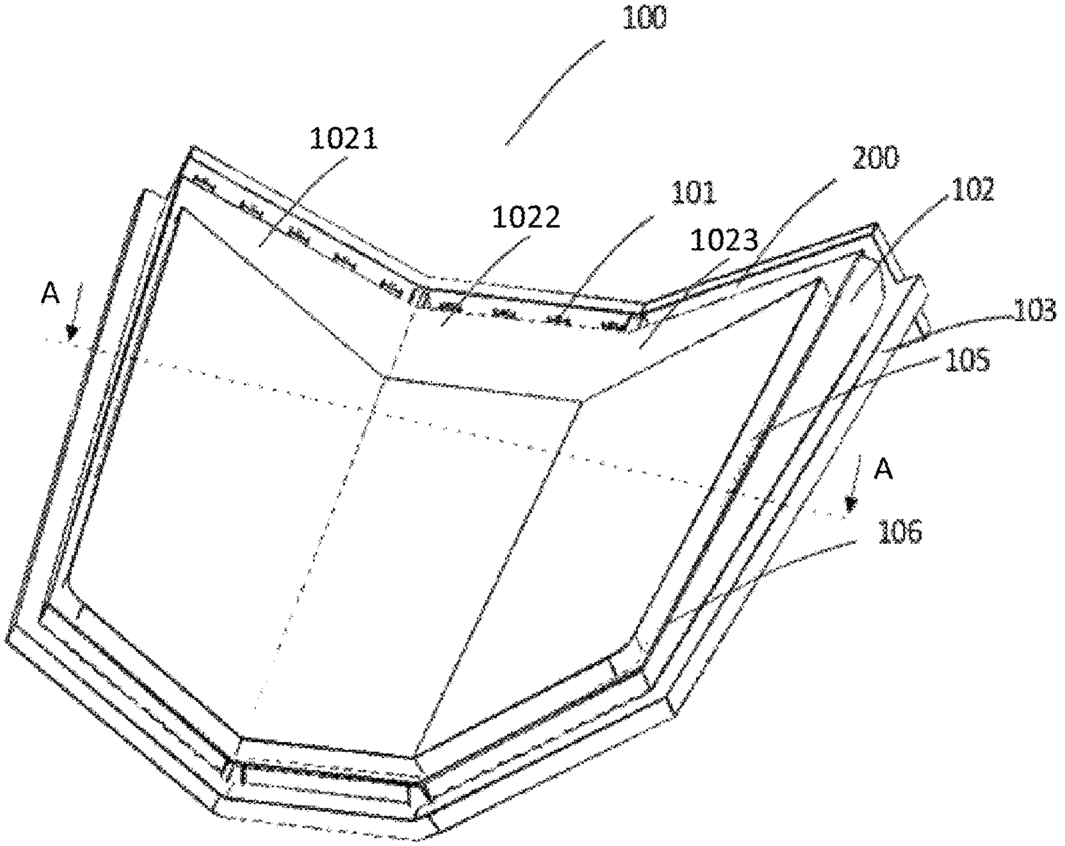
FIG. 1 is a front view of an optical component according to an embodiment of the present invention.

Embodiments of the present invention will be illustratively described below. As should be appreciated by those skilled in the art, the embodiments described may be modified in various ways without departing from the concept of the present invention. Thus, the drawings and description are essentially exemplary rather than limiting. In the following text, identical reference numerals generally denote elements with identical or similar functions.

Figure 2:
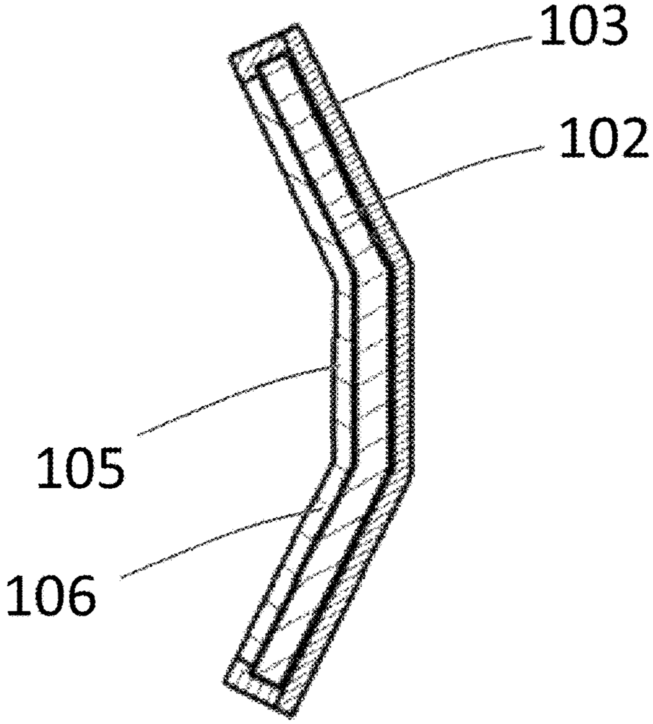
FIG. 2 is a cross-sectional view of the optical component in FIG. 1 according to one embodiment.
Figure 3:
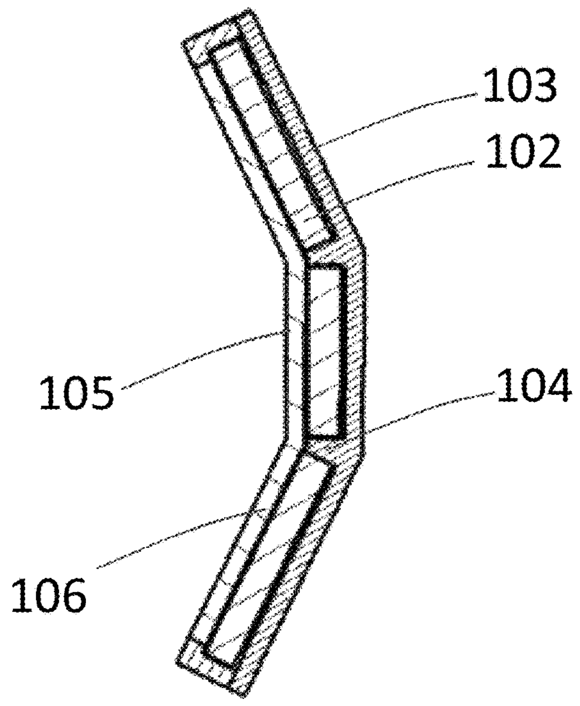
FIG. 3 is a cross-sectional view of the optical component in FIG. 1 according to another embodiment.
Figure 4:
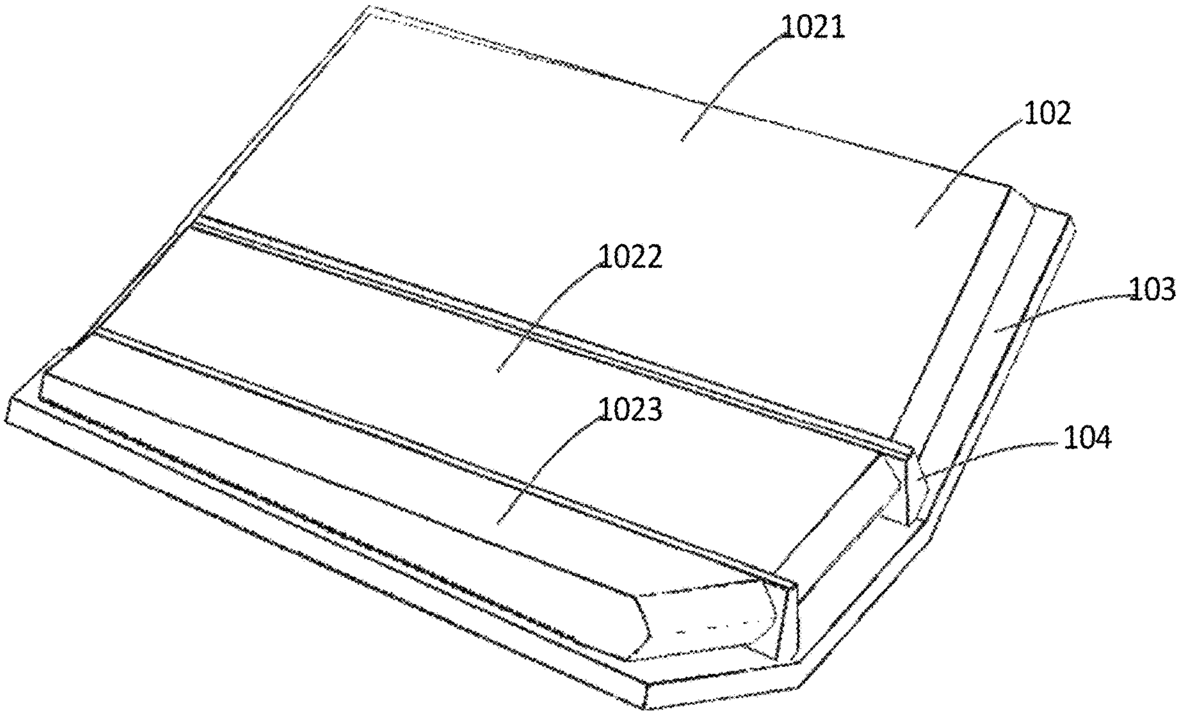
FIG. 4 is a schematic diagram of the optical component in FIG. 3.

FIG. 1 is a front view of the optical component 100 according to an embodiment of the present invention; FIG. 2 is a cross-sectional view of the optical component in FIG. 1 according to one embodiment; FIG. 3 is a cross-sectional view of the optical component in FIG. 1 according to another embodiment; and FIG. 4 is a schematic diagram of the optical component in FIG. 3.

The optical component 100 according to an embodiment of the present invention may be used to implement one or more functions of the indicator lamp, brake lamp, side-marker lamp, parking lamp, reversing lamp, daytime running lamp, position lamp, grille lamp, etc., wherein the optical function is not specifically limited.

A lighting device may comprise at least one optical component 100 according to the present invention, each optical component 100 being configured to achieve a specific optical function, and they may be staggered to make a specific shape, wherein, indeed, it may be understood that the lighting device may comprise any number of optical components 100, and these optical components 100 may be arranged freely according to shape requirements.

As shown in FIGS. 1-3, the optical component 100 comprises a light source 101, a light guide unit 102, and a backplate 103. The light source 101 is mounted on a printed circuit board 200 to emit light towards the light guide unit 102, the light source 101 including, for example, but not limited to, an LED light source, and, as shown in FIG. 1, the light guide unit 102 comprising an end face as well as a front surface and a rear surface connected by the end face, wherein light from the light source 101 enters the interior of the light guide unit 102 from the end face and propagates between the front and rear surfaces of the light guide unit 102 and towards the end facing the end face, and meanwhile, the light exits from the front surface of the light guide unit 102 along the main light output direction, which means that the front surface serves as the light output surface of the light guide unit 102, thereby producing a surface illumination effect.

According to an embodiment of the present invention, the light source 101 and the light guide unit 102 are combined to achieve a surface illumination effect, which, compared with an OLED solution, allows a great reduction in cost.

In addition, for the light guide unit 102, some light may leak from the rear surface of the light guide unit 102, which reduces the optical efficiency. Therefore, as shown in FIGS. 1-3, the optical component 100 further comprises a backplate 103, which is located on the side near the rear surface of the light guide unit 102, that is, the side opposite the front surface, and is configured to reflect, towards the front surface, light that leaks from the rear surface. In an embodiment of the present invention, a backplate 103 is arranged on the back side of the light guide unit 102 to reflect light that leaks from the light guide unit 102, which is beneficial to improving the optical efficiency and uniformity of the luminescent effect. In some alternative examples, the backplate 103 is located on the same side as the rear surface of the light guide unit 102 and is configured to support the light guide unit 102 without providing reflection function (for example, but not limited to, the case where light from the light guide unit 102 does not leak from the rear surface).

In some examples, a color and/or material that can reflect light, for example, a white backplate, may be chosen for the backplate, but the present invention is not limited thereto.

In an alternative example, the backplate 103 may comprise a reflecting layer, in which case a non-reflective color and/or material may be chosen for the backplate 103. The reflecting layer is arranged between the backplate 103 and the light guide unit 102, and is configured to reflect light from the light guide unit 102 towards the light output surface. The backplate 103 and the reflecting layer may be formed integrally, for example, but not limited to, by injection molding processes (such as secondary injection molding and in-mold injection molding) or spraying processes, and they may also be formed separately.

In some examples, light from the light source 101 enters the interior of the light guide unit 102 and propagates by total reflection, wherein, to allow the light to exit from the front surface of the light guide unit 102, the light guide unit 102 may internally comprise scattering particles, and the light from the light source 101 may be scattered in different directions by the scattering particles, which breaks the condition for the total reflection of light, so that the light exits from the front surface of the light guide unit 102. Such a light guide unit with scattering particles has very good light diffusion properties, so it can achieve a very uniform light illumination effect. As a non-restrictive example, for such a light guide unit, a light guide made of polymethyl methacrylate (PMMA), for example, a light guide with the brand of LED 8N LD12, LD24, LD48, or LD96, or a light guide made of polycarbonate (PC), for example, a light guide with the brand of EL2245, may be chosen, whose color may be selected according to needs, including, but not limited to, no color, light red color, and red color.

In an alternative example, an optical decoupling element may be provided on the rear surface of the light guide unit 102 to destroy the total reflection condition of light. Examples of the optical decoupling element include, but are not limited to, protrusions, depressions, saw teeth, ridges, stripes, squares, and the like.

In some examples, the light guide unit 102 comprises at least a first portion 1021 and a second portion 1022, the first portion 1021 and second portion 1022 being arranged at a certain angle to each other. By arranging the first portion 1021 and second portion 1022 at an angle to each other, a lighting effect with stereoscopic visuality may be produced. An angle between the at least first portion 1021 and second portion 1022 is adjustable according to actual needs, not limited in the present invention. However, it should be noted that when the light guide unit 102 comprises different parts arranged at an angle to each other, the shape of the backplate 103 should also be adjusted accordingly to fit the light guide unit 102.

In a preferred example, an angle between adjacent parts in the light guide unit 102 is obtuse, which means that at least two parts of the light guide unit 102 are in the shape of a concave light output surface, and such an arrangement makes it possible to achieve higher brightness and improves the efficiency of the light source 101.

In the examples shown in FIGS. 1-4, the light guide unit 102 is dividable into three parts, and different parts of the light guide unit 102 are respectively denoted by 1021, 1022, and 1023 in the drawings, wherein, however, those skilled in the art are aware that the number of parts of the light guide unit 102 may be selected according to actual needs, for example, the light guide unit being dividable into two parts, three parts, four parts, or more parts to produce different shapes and effects.

FIG. 2 is a cross-sectional view of the optical component in FIG. 1 cut along A-A according to an embodiment. As shown in FIG. 2, the at least first and second portions are formed integrally to simplify the processing process of the light guide unit 102. In this embodiment, different parts of the light guide unit 102 are simultaneously lighted or extinguished as a whole.

FIG. 3 is a cross-sectional view of the optical component in FIG. 1 cut along A-A according to another embodiment. As shown in FIG. 3, the at least first portion 1021 and second portion 1022 of the light guide unit 102 are separate parts, and each part corresponds to an independently controllable light source 101. By arranging different parts of the light guide unit 102 separately, the lighting and extinguishing of the different parts are separately controllable, thus achieving different shapes and dynamic luminescent effects. The lighting and extinguishing of different parts of the light guide unit 102 are achieved by controlling the corresponding light sources 101 located on the printed circuit board 200.

In one example, an angle between adjacent parts in the light guide unit 102 is obtuse, as shown in FIG. 3, which means that at least two parts of the light guide unit 102 are in the shape of a concave light output surface. In another example, different parts of the light guide unit may also be arranged on the same plane to achieve a planar illumination effect. Due to the separate arrangement of different parts of the light guide unit 102, the lighting and extinguishing of different parts are separately controllable, thus achieving different shapes and dynamic illumination effects.

FIG. 4 is a three-dimensional view of the embodiment shown in FIG. 3. For ease of illustration, in FIG. 4, the light source 101 has been omitted, and only the light guide unit 102, the backplate 103, and the rib 104 are shown. Taking, for example, the light guide unit 102 as shown in FIGS. 3-4, which comprises three parts, it is possible to choose lighting only one part of the light guide unit 102 or two parts thereof, or lighting all the parts at the same time, or lighting the above-mentioned different parts in a certain order, wherein specific settings may be made according to needs, not limited in the present invention.

Preferably, as shown in FIGS. 3-4, a rib 104 is arranged between the at least first portion 1021 and second portion 1022 to separate the at least first portion 1021 and second portion 1022. The rib 104 is preferably formed of an opaque material to avoid optical crosstalk between different parts of the light guide unit 100.

In one example, as shown in FIG. 4, ribs 104 between different parts of the light guide unit 102 extend along the entire longitudinal direction of the light guide unit 102. This setting prevents the generation of optical crosstalk between adjacent parts of the light guide unit 102, which affects the final effect.

In one example, the length of the rib 104 exceeds the input end of the light guide unit 102 to prevent light from the light source 101 from interfering with any parts of the light guide unit 102 adjacent to the light source.

In one example, the rib 104 is integrally formed with the backplate 103 to simplify the processing process.

In one example, the height of the rib 104 is preferably adapted to the thickness of the light guide unit 102 to avoid increasing the thickness of the optical component 100 while preventing optical crosstalk. As shown in FIG. 3, the rib 104 preferably has a width that decreases as it goes further away from the backplate 103, in order to adapt to the concave shapes formed between different parts of the light guide unit 100 and also facilitate processing.

It should be noted that although the light source 101 shown in FIG. 1 receives light only from one end face of the light guide unit 102, it is comprehensible that it may also receive light from two opposite end faces of the light guide unit 102 simultaneously, and that the printed circuit board 200 may comprise a plurality of light sources 101 arranged along the end face of the light guide unit 102.

In one embodiment, as shown in FIG. 1, the optical component 100 further comprises a transparent front plate 105, wherein the transparent front plate 105 is located on the front side of the light guide unit 102, that is, the same side as the front surface, and is configured to transmit light from the front surface. The transparent front plate 105 can protect the light guide unit 102 from damage and scratches. The color of the transparent front plate may be selected according to needs, for example, red color, pink color, or no color, which is not specifically limited in the present invention.

Preferably, a pattern may be arranged on the light output surface of the transparent front plate 105 to enhance the illumination effect of the optical component 100. The pattern may be arranged according to actual needs, which, for example, may be a triangle, a hexagon, a car logo, or another suitable shape or pattern, not specifically limited in the present invention. The pattern on the transparent front plate 105 may be formed when the transparent front plate 105 is formed by injection molding or another method, or may be applied to the transparent front plate 105 after the transparent front plate 105 has been formed.

In some examples, in order to achieve specific molding effects, the transparent front plate 105 does not cover the entire light guide unit 102, in which case an opaque front plate (not shown) covering other areas of the light guide unit 102 is arranged on the periphery of the transparent front plate 105. The opaque front plate preferably extends beyond the light guide unit 102 and the light source 101 to avoid light leakage. The opaque front plate can extend to a side of the light guide unit 102 and to the other end opposite the light input end to avoid light leakage from the side of the light guide unit 102 and from the other end opposite the light input end. The opaque front plate may be made of a black material or a material having another color, or may be obtained by applying an opaque coating on a transparent material. The opaque front plate is preferably integrated with the transparent front plate 105, for example, by processes such as-dual-color injection molding.

In some examples, as shown in FIG. 1, the optical component 100 further comprises a scattering layer 106, which is arranged between the light guide unit 102 and the transparent front plate 105, and light from the light guide unit 102 enters the scattering layer and is evenly diffused by the scattering layer 106, thereby further improving the uniformity of the illumination effect. The scattering layer 106 may be made of any suitable light-permeable scattering material, for example but without limitation, poly(methyl methacrylate) (PMMA), polycarbonate (PC), etc. The scattering layer 106 may be formed integrally with the light guide unit 102 and/or the transparent front plate 105 or separately. Preferably, the scattering layer 106 has a scattering angle greater than 50 degrees and a transmittance greater than 85% to ensure uniformity of the illumination effect.

In another example, an optical microstructure is arranged on one side of the transparent front plate 105 near the light guide unit 102 to achieve the scattering effect of the scattering layer 106, thereby scattering light from the light guide unit 102 without having the scattering layer 106. Similar to the case of the scattering layer 106, the optical microstructure arranged on the side near the light guide unit 102 of the transparent front plate 105 has a scattering angle preferably greater than 50 degrees and a transmittance preferably greater than 85% to ensure uniformity of the illumination effect. The scattering microstructure on the transparent front plate 105 may be formed when the transparent front plate 105 is formed by injection molding or another process. This arrangement makes it possible to reduce costs and simplify the assembly process.

In the optical component of the present invention, different parts of the light guide unit are arranged at an angle, such that surface illumination is achievable while a three-dimensional luminescent effect is obtained. In addition, since different parts of the light guide unit are separated by ribs, the different parts are separately controllable and light leakage between adjacent parts is avoided, which allows the production of satisfactory dynamic luminescent effects.

According to an embodiment of the present invention, a lighting device is also included, which comprises any one of the optical components described above.

According to an embodiment of the present invention, a motor vehicle is further included, which comprises a lighting device as described above.

The present invention is not limited to the structure described above, and various other variants may also be used. Although the present invention has been described by means of a limited number of embodiments, those skilled in the art who benefit from the present disclosure can devise other embodiments without departing from the scope of protection of the present invention disclosed herein. Thus, the scope of protection of the present invention should be defined by the attached claims only.

What is claimed is:

1. An optical component, comprising:

a light source configured to emit light;

a light guide unit configured to receive and guide light emitted by the light source and output the light from a light output surface of the light guide unit, the light guide unit includes at least a first portion and a second portion, the at least first portion and second portion being arranged at an obtuse angle to each other with a rib provided between the at least first portion and second portion to separate the at least first portion and second portion; and a backplate configured to provide support for the light guide unit.

2. The optical component according to claim 1, wherein the light source is provided at one end of the light guide unit.

3. The optical component according to claim 2, wherein the light guide unit extends substantially perpendicular to a main emitting direction.

4. The optical component according to claim 1, wherein the at least first portion and second portion are integrally formed.

5. The optical component according to claim 1, wherein the at least first portion and second portion of the light guide unit are arranged on one same plane.

6. The optical component according to claim 1, wherein the rib is integrally formed with the backplate.

7. The optical component according to claim 1, wherein the rib extends along the entire longitudinal direction of the light guide unit.

8. The optical component according to claim 1, wherein the length of the rib exceeds an input end of the light guide unit.

9. The optical component according to claim 1, further comprising a transparent front plate, the transparent front plate being arranged on a light output side of the light guide unit and configured to transmit light from the light output surface.

10. The optical component according to claim 9, further comprising a scattering layer, the scattering layer being arranged between the light guide unit and the transparent front plate.

11. A lighting device comprising an optical component, the optical component includes a light source configured to emit light, a light guide unit configured to receive and guide light emitted by the light source and output the light from a light output surface of the light guide unit, the light guide unit includes at least a first portion and a second portion, the at least first portion and second portion being arranged at an obtuse angle to each other with a rib provided between the at least first portion and second portion to separate the at least first portion and second portion, and a backplate configured to provide support for the light guide unit.

12. A vehicle comprising a lighting device, with the lighting device including an optical component that includes a light source configured to emit light, a light guide unit configured to receive and guide light emitted by the light source and output the light from a light output surface of the light guide unit, the light guide unit includes at least a first portion and a second portion, the at least first portion and second portion being arranged at an obtuse angle to each other with a rib provided between the at least first portion and second portion to separate the at least first portion and second portion, and a backplate configured to provide support for the light guide unit.

* * * * *